Feb. 21, 1928.

C. F. JENKINS 1,659,736

RADIO VISION ILLUMINATION

Filed March 14, 1925

Inventor
C Francis Jenkins.

Florence M. Anthony.

Patented Feb. 21, 1928.

1,659,736

UNITED STATES PATENT OFFICE.

CHARLES FRANCIS JENKINS, OF WASHINGTON, DISTRICT OF COLUMBIA.

RADIO VISION ILLUMINATION.

Application filed March 14, 1925. Serial No. 15,586.

This invention relates to apparatus for radio vision reception, and has for its principal object means for conserving and most effectively utilizing the light employed in the reproduction of distant scenes in action.

Heretofore all attempts to illuminate the screen upon which the scene is to reproduced has consisted in illuminating the whole screen area and then interposing revolving shutters or other means whereby only a very minute part of the whole light would fall upon the screen at any moment. To illustrate:—

If it be assumed that the scanning opening moving across the screen is but one-hundredth of the width, and an equal proportion of the height of the area to be covered, then the scanning opening is but one ten-thousandth of the whole area. This is equivalent to saying that only one ten-thousandth of the entire value of the light source falls on the screen at any one moment, and this is not enough for success.

As no very intense source of light is available, which can be directly modulated by a received radio current, it will readily be understood that, if possible, a method should be employed which utilizes the whole light all the time.

With this and other objects in view the invention of this application consists in the novel details of assembly of the various devices employed, hereinafter disclosed, and particularly pointed out in the claims.

Referring to the accompanying drawings forming a part of these specifications—

Figure 1:
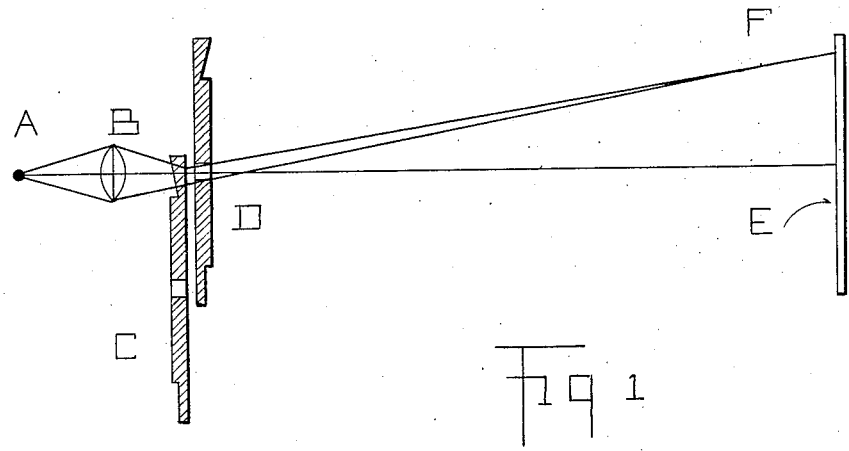
Figure 2:
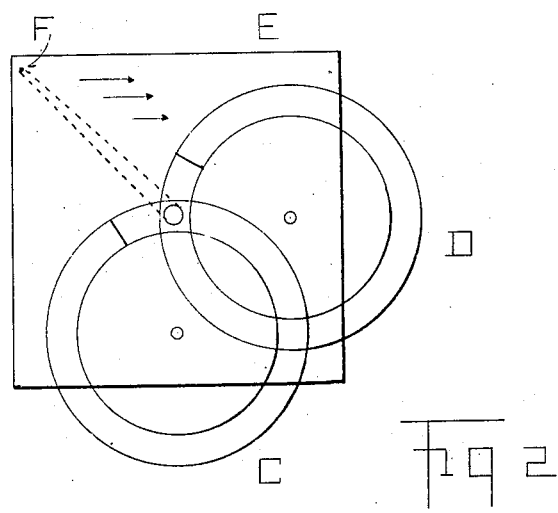

In the drawings Fig. 1 is a side elevation; and Fig. 2 an elevation looking toward the picture screen partly through the glass discs. In the figures A is a source of light; B an objective; C and D sectioned prismatic rings (Patent No. 1,385,325) for oscillating the cone of light F from the source A; E a screen upon which the cone falls; and F the point of the light cone.

As is now well known the rotation of the prismatic rings gives to the cone of light an oscillation in the plane of the diameter of each prismatic ring, and, therefore, the rotation of ring D would cause the spot F to travel across the screen E in a horizontal direction; while rotation of the ring C gives the cone an oscillation in a vertical direction. If the ring D rotates five hundred times oftener than the other, there will be five hundred successive, adjacent, parallel lines drawn by the spot F across the screen from left to right as suggested by the arrows.

There falls on the screen, therefore, the full intensity of the image of the whole of the light source at all times, and this is the object of this invention.

If the image of the light were spread over the whole screen, and the screen then scanned by a limited opening of a size equal to the spot of the present method, the light would be so attenuated as to be invisible.

It should be remembered that the only light sources known at this time, which can be directly modulated by incoming radio signals, are very small, and it is necessary to conserve this light in every possible manner.

The method herein disclosed is, therefore, of very great importance, in fact, at this time, is the only method by which acceptable results can be attained.

It is also well known that if the whole picture surface E is covered in one-sixteenth of a second by the traversing light source, then persistence of vision makes the whole surface seem to be lighted, just as the old childhood game of a whirling lighted stick seems to make a lighted ring.

The method of making a picture of this lighted area by cutting off or varying the light in a definite order, is the subject of other applications.

What I claim is—

1. In the reception and translation into a picture of electric current values representing light values of a distant scene or the like, the combination of means for concentrating by direct projection approximately all the light of a modulated light-source upon a single spot on a picture receiving surface, and means for causing the said spot to traverse said surface comprising a movable prism for giving said spot a lateral direction, and a second prism simultaneously movable to give the spot a movement perpendicular to the direction of the first movement.

2. In the reception and translation into a picture of electric current values representing light values of a distant scene or the like, the combination of means for concentrating by direct projection approximately all the light of a modulated light-source upon a single spot on a picture receiving surface, and means for causing the said spot to traverse said surface comprising a prism rotated in such manner that the axis of a ray of light passing therethrough will be given a lateral direction, and a second prism so located and rotated that the said ray of light will be given a movement in a plane approximately perpendicular to the movement of the first movement of the light ray.

In testimony whereof I have affixed my signature.

CHARLES FRANCIS JENKINS.